United States Patent [19]

Sharak et al.

[11] 4,269,563
[45] May 26, 1981

[54] WIND TURBINE

[75] Inventors: Errol W. Sharak, 18775 W. Observatory Rd., New Berlin, Wis. 53151; George E. Sharak, Sr., Milwaukee, Wis.

[73] Assignee: Errol W. Sharak, New Berlin, Wis.

[21] Appl. No.: 65,343

[22] Filed: Aug. 9, 1979

[51] Int. Cl.³ .............................................. F03D 3/04
[52] U.S. Cl. ................................ 415/2 R; 416/197 A
[58] Field of Search ....................................... 415/2-4; 416/197 A

[56] References Cited

U.S. PATENT DOCUMENTS

| 1,248,305 | 11/1917 | Gallagher | 415/2 R X |
| 1,531,015 | 3/1925 | Maine | 415/2 R |
| 1,595,578 | 8/1926 | Sovereign | 416/197 A X |
| 2,812,823 | 11/1957 | De Oviedo | 416/197 A X |
| 3,994,621 | 11/1976 | Bogie | 416/197 A X |
| 4,047,834 | 9/1977 | Magoveny et al. | 415/3 |
| 4,059,969 | 11/1977 | Awalt | 415/2 R X |
| 4,162,410 | 7/1979 | Amick | 415/2 R X |

FOREIGN PATENT DOCUMENTS

| 867380 | 2/1953 | Fed. Rep. of Germany | 415/2 R |
| 3672 | 2/1833 | France | 415/2 |
| 22654 | 8/1921 | France | 415/2 R |
| 545003 | 10/1922 | France | 415/2 R |
| 792252 | 12/1935 | France | 415/2 R |
| 513279 | 2/1955 | Italy | 415/2 |

Primary Examiner—Everette A. Powell, Jr.
Attorney, Agent, or Firm—Andrus, Sceales, Starke & Sawall

[57] ABSTRACT

The invention is directed to a wind turbine normally located in a vertical position in operation to provide a propulsion energy force. In general, the wind turbine consists of a central rotor unit having a plurality of spaced, longitudinally extending scoop-like collector blades joined together so that no air can pass through them, to rotate a central power take off shaft when engaged by air currents. The air is directed to the rotor blades by straightly extending vertical air guide panels which intermittently surround the rotor unit and direct air currents to the rotor unit for rotation by the wind. The air guide panels are closed at the top and bottom by horizontally extending guide panels which are canted in complementary directions. The upper panel is tilted downwardly as it progresses inwardly and the lower panel is tilted upwardly on its inward extent to thereby increase the velocity and pressure of the wind as it is directed to the rotor unit.

3 Claims, 4 Drawing Figures

WIND TURBINE

BACKGROUND OF THE INVENTION

The invention is directed to a wind turbine to provide power from one of natures most abundant sources of hourly available energy. The wind turbine consisting essentially of a central rotor having scoop-like blades and outer air guides of a special construction which direct air to the rotor for rotation of the latter. The wind turbine is provided in numerous sizes to vary its uses, to save other types of fuels and to meet zoning and environmental requirements.

SUMMARY OF THE INVENTION

The invention is directed to a wind turbine normally mounted upon a vertical axis. The turbine in general consists of a rotor having a series of circumferentially spaced bisected cylinders which provide semi-circular shaped blades or collectors of some height to receive air directed to them. Each collector has an inner edge riveted or welded to the rear portion of an adjacent collector to prevent the flow of air into the area inside the collectors.

The collectors are secured on opposite ends to an upper and lower plate which in turn are secured to spiders. The spiders each have a central bearing hub which is connected to a central driven or take off shaft. An upper bearing receives the upper end of the shaft for rotation and is supported in a plate which extends inwardly from the roof which covers the wind turbine. A lower bearing receives the lower end of the shaft for rotation therein and is supported on a base mount.

The rotor unit is surrounded by a plurality of circumferentially spaced vertically extending air guide panels to deflect incoming air to the collectors to rotate the latter. The air guide panels extend on a straight line outwardly from the rotor unit but free of the unit so that the latter can rotate therein. The outer edge of each panel has a nose cone construction for air pattern division and resistance to wear.

The upper area between each vertical air guide panel is closed by an upper horizontal extending air guide panel which slopes downwardly toward the rotor unit and the lower area between each panel is closed by a horizontally lower air guide panel which slopes upwardly toward the rotor unit. In addition, each upper and lower horizontally extending panel is canted slightly in a direction complementary to a respective opposite panel. The described slant and canting of the upper and lower horizontal air guides provides a construction whereby the velocity of the air currents captured by the wind turbine is increased in its passage to the rotor which builds up the air pressure delivered to the rotor.

The wind turbine is supported on a frame structure at the bottom in a position spaced from the supporting surface so that the shaft driven by the rotor can extend downwardly to drive a take off unit and thus provide energy to a receiving source, not shown.

DETAILED DESCRIPTION OF THE INVENTION

Figure 1:
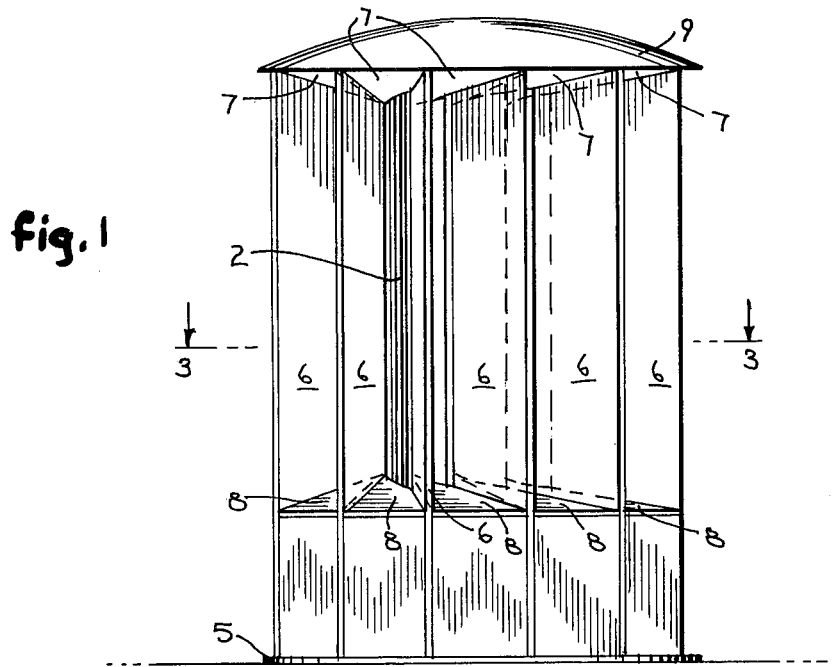
FIG. 1 is an elevational view of the preferred embodiment of the wind turbine of the invention.

Referring to the drawings, there is shown a wind turbine 1 having in general a central rotor 2 secured to a central take off shaft 3 driven by air applied to rotor 2 and supported in longitudinally spaced relation on the frame 4 from a supporting surface 5 such as concrete or the like.

The rotor 2 is surrounded by circumferentially spaced vertically extending air guides or panels 6 in turn secured to a support 5.

The upper spaces between the air guides 6 are closed by upper horizontally extending panels or air guides 7. The lower spaces between the air guides 6 are closed by lower horizontally extending air guides 8. The wind turbine is completed by a roof 9 which covers the top of the rotor 2 and the respective panels of air guides 6 and 7, and the vertical guides or panels 6 at the upper end are secured to the plate 9a provided as part of roof 9.

More specifically, the rotor 2 is constructed of a plurality of circumferentially spaced interlocking and elongated scoopes or air collectors 10 which are normally in effect bisected cylinders that provide the semi-circular shape of collectors 10. However, collectors 10 could be of various different scooplike shapes. The inner end of each collector 10 is welded or riveted to the back of an adjacent collector 10 as shown at 11 to prevent the flow of air to the interior 12 of the rotor 2.

Collectors 10 may be of substantially any length and for the best operation, range from twelve to thirty in number with variance of the length being based on the size of wind turbine 1, zoning codes and specified uses.

Collectors 10 are secured on the opposite ends to the upper and lower closure plates 13 which cover the collector ends and in turn are secured to the spiders 14. Plates 13 inhibit entry of air to the inside of rotor 2 and thereby prevent air turbulence within rotor 2. Spiders 14 each have a central bearing hub 15 which is connected to the driven or take off shaft 3. Shaft 3 at each end is lodged in the bearings 17 for rotation therein, the upper bearing 17 being supported on plate 16 extending from roof 9 and the lower bearing 17 on the base mount 18. Rotation of the collectors 9 by air currents rotates shaft 3 within bearings 17. The collectors 9 could be vertically banked to build a higher turbine unit in which case additional spiders 14 would be employed.

Power may be taken off from shaft 3 at the lower end by a power train consisting of a drive gear 19 secured to the shaft 3 and engaging a driven gear 20 connected to a horizontal shaft 21 which drives an element, such as a pulley or the like, not shown.

Vertical air guides 6 which surround rotor 2 extend on a straight line adjacent the collectors 9 of rotor 2 to the outside of the structure and terminate within the outer end of roof 9. The spacing of air guides 6 from collectors 9 allows rotor 2 to freely rotate inside air guide 6. Air guides 6 are spaced circumferentially a greater distance from each other at the outer end than at the inner end to provide a funnel-like passage for air currents to rotor 2 in a gradually narrowing passageway to aid in building up pressure in the air flowing in the wind turbine.

The number of air guides 6 may vary but the best results have been obtained when twelve are utilized because guides 6 Then provide improved direct flow to rotor 2. The straight line extent of air guides 6 prevents air turbulence from building up between the guides by air flowing off one guide and into an adjacent air guide.

Air guides 6 are also provided with a rounded shape at the outer ends 22 to offer less resistance to the incoming air and to decrease wear of the guides 6.

The increase of the pressure of the air in its inward passage to rotor 2 is also developed by several other constructions.

Figure 2:
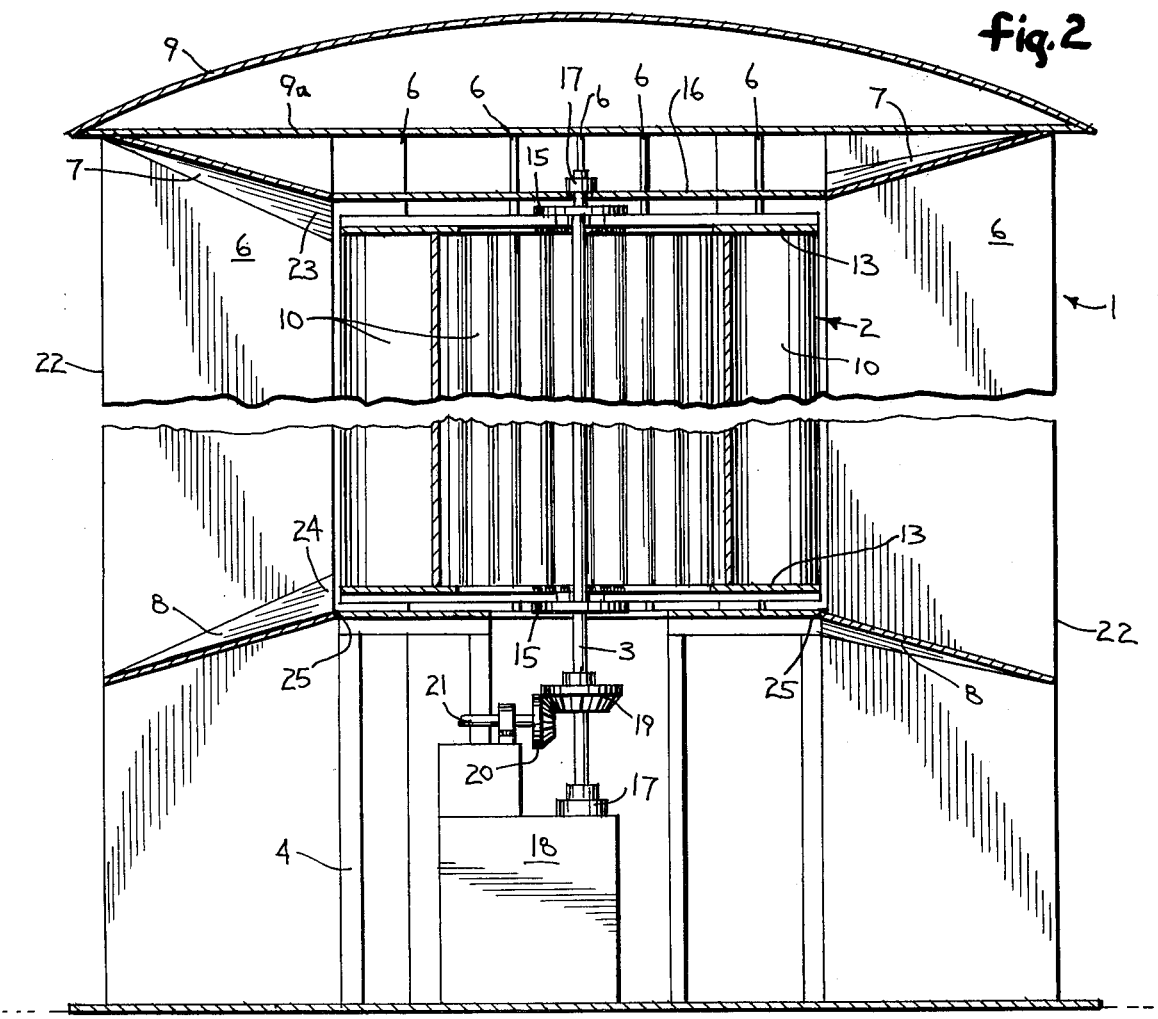
FIG. 2 is a sectional view taken on line 2—2 of FIG. 3.
Figure 3:
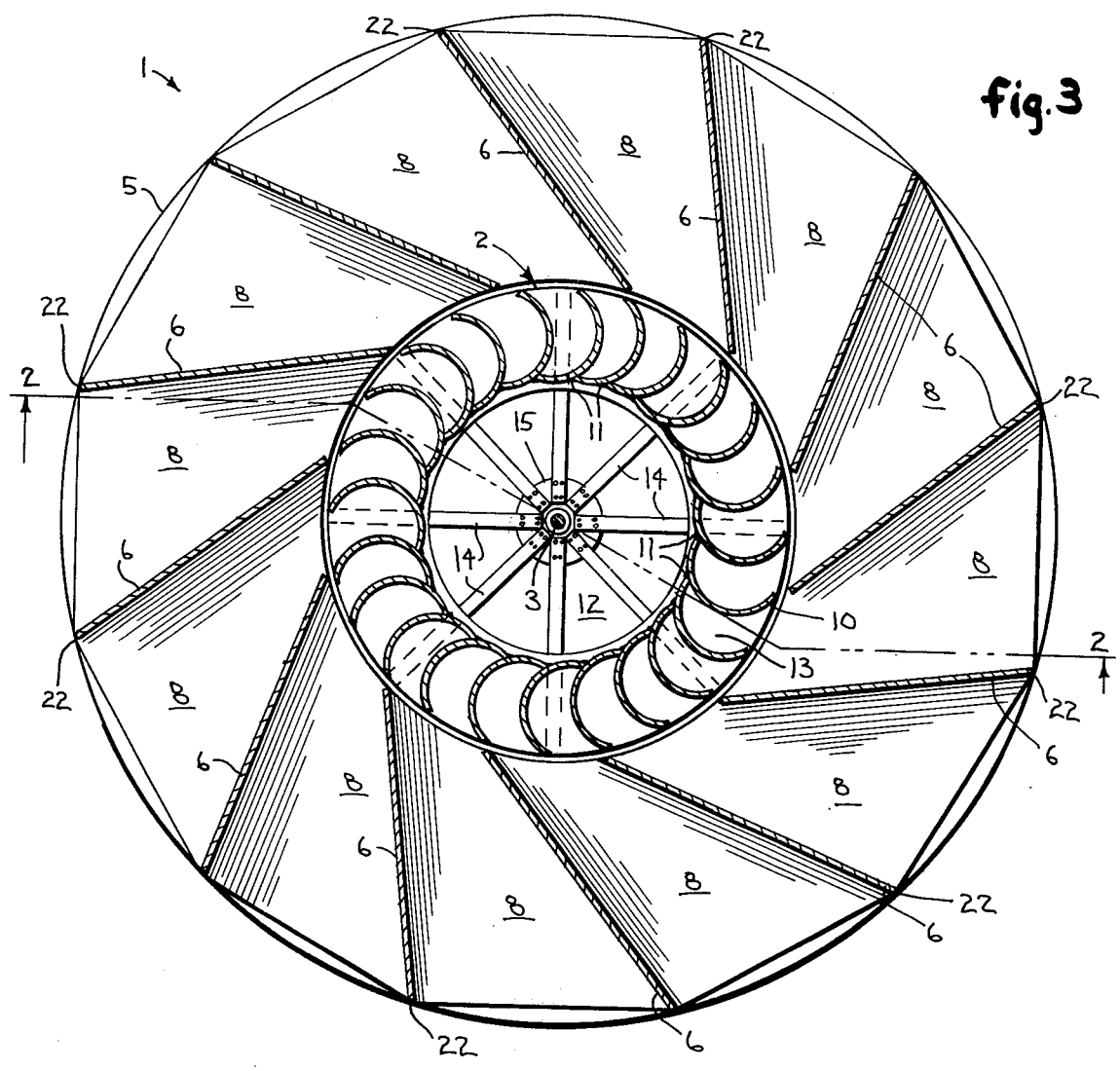
FIG. 3 is a section taken on line 3—3 of FIG. 1.
Figure 4:
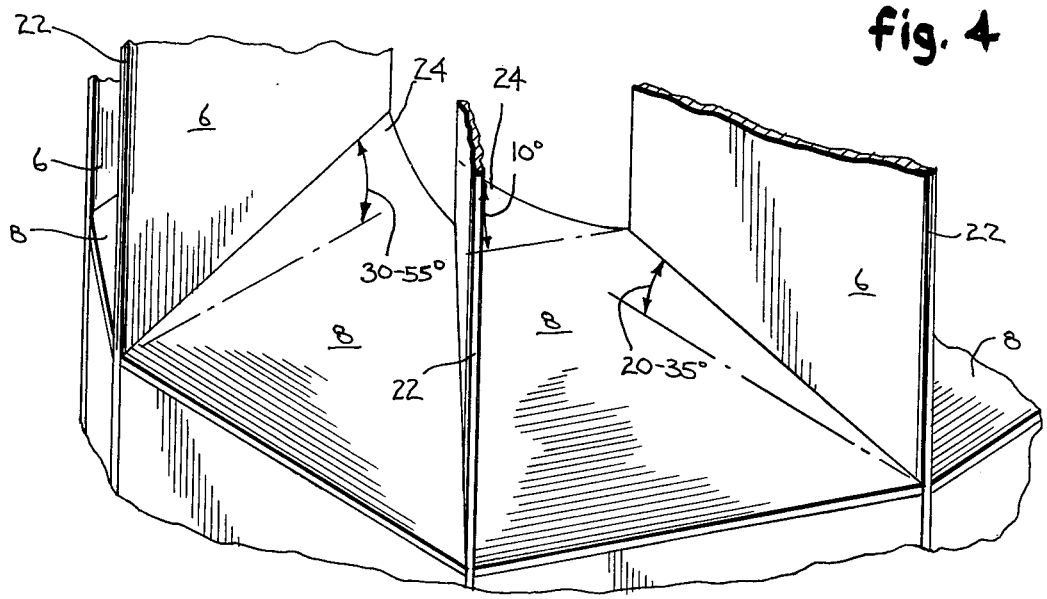
FIG. 4 is an enlarged detail view illustrating the upward slope and canting of the lower closure horizontally extending guide panel.

Referring to FIG. 2, the upper space or area between air guides 6 is closed by upper horizontally extending air guides 7 which are secured to air guide panels 6. Upper air guides 7 in their extent to rotor 2 gradually slope or are tilted downardly and are slightly canted as at 23. In addition, the lower space or area between air guides 6 is closed by lower air guides 8 and as shown in FIG. 4, in their extent inwardly of the wind turbine 1 air guides 8 gradually slope or are tilted upwardly and are also canted as at 24. The canting of the upper air guides 7 is complementary to the lower air guides 8.

The slope and cant of the lower horizontal air guides 6, for satisfactory reuslts as illustrated in FIG. 4 may range at an angle from 0° to 30°-55° on the upper side and at an angle from 0° to 20°-35° on the lower side of air guide 6. Assuming, for example, that the range on the upperside of the horizontal air guides 6 was from 0° to 30° and on lower side from 0° to 20°, then the cant on the inner edge would be at an angle of approximately 10°. The previous description would also be applicable to the upper horizontal air guides 6 as the tilt and cant of the upper and lower air guides 6 are provided complementary to each other.

These described constructions increase the velocity of the air and builds up pressure in the air for discharge to the rotor 2 to rotate the latter.

The inner portions 25 of the lower air guide 8 is secured to and supported on the frame 4 and the upper air guides 7 are supported on roof plate 16.

The lower portion of wind turbine 1 as shown in the drawings, is open through the vertical air guide panels 6 but in service it might well be closed so that access to the rotating shaft and gear train could not be made and to protect these parts from the elements. In some constructions the vertical air guide panels 6 need not extend to support 5, and likewise the rotor 2 could be supported for rotation within air guide panels 6 in a number of different ways.

The funnel type pattern of control employed has yielded an air thrust ratio of 3.5 to 1 from point of entry to point of collector contact. Ratio results from one test indicated that a constant 12 mph wind achieved a 42 mph collector thrust for the propulsion drive. Because the vertical air guides encircle the collector rotor there is only minimal thrust loss during wind change direction and near zero back pressure is encountered on the collectors as each collector is riveted or welded to the preceding one.

The wind turbine has been described for use in a vertical position but it is contemplated that in some applications it could used in a horizontal position.

Various modes of carrying out the invention are contemplated as being within the scope of the following claims particularly pointing out and distinctly claiming the subject matter which is regarded as the invention.

We claim:

1. A wind turbine comprising a centrally located rotor having a plurality of circumferentially spaced collectors facing in the same direction, means securing their ends together to prevent air from flowing to the area inside the assembled collectors, closure plates disposed at opposite ends of the rotor preventing entry of air to the inside of the rotor through the respective ends of the rotor to prevent internal turbulence in the rotor, a centrally located shaft extending through the rotor, hub members receiving the shaft at opposite ends of the rotor for rotation therein by the rotor, and take off means disposed at one end of the shaft to take off the power developed by the rotation of the rotor and shaft and a plurality of circumferentially spaced longitudinally extending air guide panels disposed around the rotor but free thereof, the said air guide panels each extending outwardly from the rotor in a generally straight line and spaced from each other a greater distance at the outer ends compared to the inner ends to provide funnel-like passages to the rotor to better direct air flow thereto, and the upper air space between the straightly extending air guides being closed by upper panels and the lower air space between the straightly extending air guides being closed by lower extending panels, the upper panels being tilted downwardly in their extent from the outer end of the turbine to the rotor and the upper air space between the air guides being closed by lower panels tilted upwardly in their extent from the outer end of the turbine to the rotor generally complementary to the upper panels and each lower and upper panel being canted toward each other in a complementary manner and away from an air guide toward an adjacent air guide to complete the funnel-like passages between the air guides for flow of air from outside the turbine to the rotor for rotation of the latter.

2. The wind turbine of claim 1 and the outer edges of the air guide panels being rounded to decrease resistance to movement of the air currents through the air guides and to the rotor.

3. The wind turbine of claim 1 in which the slope and cant of the panels at both the top and bottom of the wind tunnel slope is on the one side at an angle from 0° to 30°-50° and on the other side at an angle from 0° to 20°-35°.

* * * * *

UNITED STATES PATENT AND TRADEMARK OFFICE
CERTIFICATE OF CORRECTION

PATENT NO. : 4,269,563
DATED : May 26, 1981
INVENTOR(S) : ERROL W. SHARAK and GEORGE E. SHARAK, JR.

It is certified that error appears in the above-identified patent and that said Letters Patent are hereby corrected as shown below:

Column 2, Line 26, cancel "scoopes" and substitute therefor ---scoops---

Column 3, Line 1, cancel "Then" and substitute therefor ---then---

Column 4, Line 5, after "could" insert ---be---

Column 4, Line 37, cancel "upper" and substitute therefor ---lower---
CLAIM 1

Signed and Sealed this

Tenth Day of November 1981

[SEAL]

Attest:

GERALD J. MOSSINGHOFF

Attesting Officer

Commissioner of Patents and Trademarks